(12) United States Patent
Mentze et al.

(10) Patent No.: US 9,031,070 B2
(45) Date of Patent: May 12, 2015

(54) METHODS FOR CONTROLLING ELECTIONS IN A MULTICAST NETWORK

(75) Inventors: Duane Edward Mentze, Roseville, CA (US); Mark Gooch, Roseville, CA (US); Steven Glen Jorgensen, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/981,936

(22) PCT Filed: Feb. 18, 2011

(86) PCT No.: PCT/US2011/025495
§ 371 (c)(1),
(2), (4) Date: Jul. 26, 2013

(87) PCT Pub. No.: WO2012/112162
PCT Pub. Date: Aug. 23, 2012

(65) Prior Publication Data
US 2013/0315090 A1    Nov. 28, 2013

(51) Int. Cl.
*H04L 12/28* (2006.01)
*H04L 12/733* (2013.01)
*H04L 12/18* (2006.01)

(52) U.S. Cl.
CPC .......... *H04L 45/122* (2013.01); *H04L 12/1886* (2013.01)

(58) Field of Classification Search
USPC ........................................................ 709/238
See application file for complete search history.

(56) References Cited

U.S. PATENT DOCUMENTS

| | | | |
|---|---|---|---|
| 6,728,220 B2 | 4/2004 | Behzadi | |
| 7,644,177 B2 | 1/2010 | Kouvelas et al. | |
| 7,860,093 B2* | 12/2010 | Shepherd et al. | ............. 370/390 |
| 8,391,185 B2* | 3/2013 | Wijnands et al. | ............. 370/256 |
| 2003/0236870 A1 | 12/2003 | Boivie et al. | |
| 2004/0205215 A1* | 10/2004 | Kouvelas et al. | ............. 709/231 |
| 2005/0083933 A1 | 4/2005 | Fine et al. | |
| 2006/0268869 A1 | 11/2006 | Boers et al. | |
| 2008/0298360 A1 | 12/2008 | Wijnands et al. | |
| 2009/0161670 A1 | 6/2009 | Shepherd et al. | |
| 2010/0085898 A1 | 4/2010 | Giaretta et al. | |
| 2010/0189113 A1 | 7/2010 | Csaszar et al. | |

FOREIGN PATENT DOCUMENTS

WO    WO-2012112162 A1    8/2012

OTHER PUBLICATIONS

Draft (Oct. 2007) M. Handley et al., "Bidirectional Protocol Independent Multicast (BIDIR-PIM)" See RFC 5015 Section 3.5, Figure 3
ISR dated Nov. 4, 2011.

(Continued)

*Primary Examiner* — Duc C Ho

(57) ABSTRACT

Methods for controlling a Designated Forwarder (DF) election in a multicast network are described herein. The multicast network includes a plurality of multicast network devices, including a first network device and a second network device. A Designated Forwarder is determined. It is determined whether to initiate a Designated Forwarder election based on a comparison of a metric measuring a distance to a Rendezvous Point Address from a first network device and a metric measuring the distance to the Rendezvous Point Address from the second network device.

15 Claims, 5 Drawing Sheets

METHODS FOR CONTROLLING ELECTIONS IN A MULTICAST NETWORK

CROSS-REFERENCE TO RELATED APPLICATION

This application is a U.S. National Stage Application of and claims priority to International Patent Application No. PCT/US2011/025,495, filed on Feb. 18, 2011, and entitled "METHODS FOR CONTROLLING ELECTIONS IN A MULTICAST NETWORK".

I. BACKGROUND

Multicasting is a method for simultaneously delivering data over a network from a data source to a number of data receivers in a multicast group. Multicasting systems employ routing protocols to link the data sources to the appropriate data receivers in an efficient manner.

Multicasting networks are provided by multicast enabled nodes within or connected to an existing network. The nodes comprise multicast sources, multicast receivers and multicast routers. A multicast source is a source of the multicast data that is carried via the network to multicast receivers. The multicast routers are arranged to route the multicast packets across the network between the multicast sources and receivers.

A loop is a cyclical path which causes a packet to return to a node on the path from which node the packet has already been transmitted. For multicast traffic, route looping can pose issues. A looping multicast packet continuously generates copies as it loops, which in turn generates additional copies. These looping multicast packets begin to saturate the link which can quickly paralyze the network and significantly impact performance for routing other network traffic.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION

Figure 1:
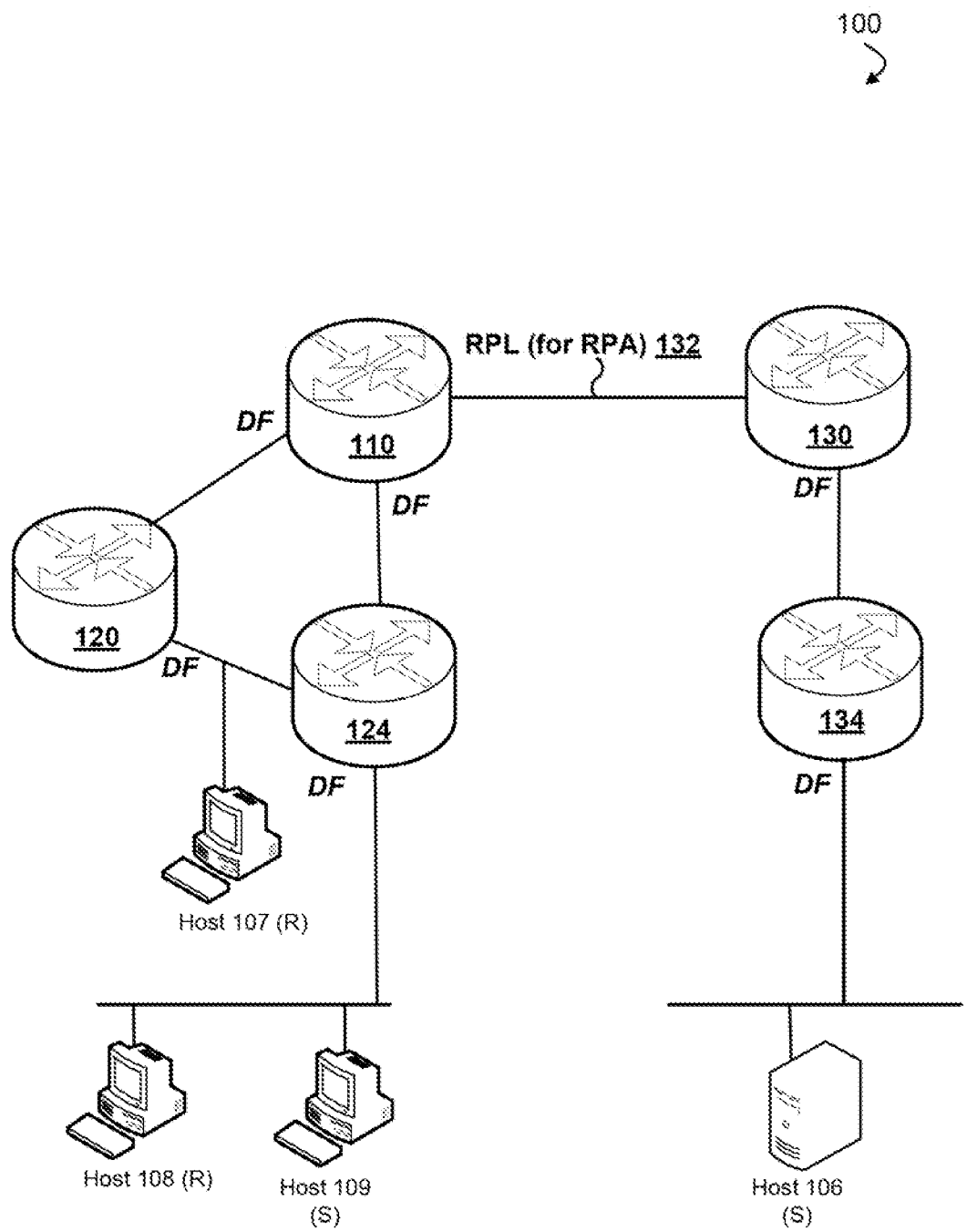
FIG. 1 is a topological block diagram of a network system in accordance with an embodiment.

Bidirectional Protocol Independent Multicast (bidir-PIM), as standardized in RFC 5015, is a multicast protocol that is used to route a multicast packet from a source to multiple destinations. Routing of multicast packets in a multicast network is based on an Internet Protocol (IP) multicast address and multicast tables provided in each router element. A multicast distribution tree is created to ensure distribution to intended receivers while limiting distribution so that network segments that are not in the path between a source and receivers are not burdened with excess traffic.

In a network implementing the bidir-PIM protocol, multicast packets are sent along a shared tree. The shared tree may be represented by a (*, G) state. In any network, a single Designated Forwarder (DF) exists for each link except for a Rendezvous Point (RP) link. A Rendezvous Point Address (RPA) is used as a root of a distribution tree for a range of multicast groups. An RP link for a particular RPA is the physical link to which the RPA belongs. One router on each network link for each interface (e.g., one router per LAN per RP) is designated as the DF. A router may be elected as DF on more than one interface.

The DF forwards downstream traffic onto its link and forwards upstream traffic from its link towards the RP link. All other network devices on that link either forward multicast packets or send bidir-PIM control messages to the DF, which then forwards the control messages or network traffic towards the RP for upstream routing.

To elect a DF, all routers on a link exchange their unicast routing metric to reach the RPA. Routers advertise their own metrics using bidir-PIM control messages including offer, winner, backoff, and pass control messages. The router with the best route is elected as the DF. This effectively builds a shortest path between every subnet and the RPA without consuming any multicast routing state (i.e., no (S, G) entries are generated).

A conflict with the DF election may occur whereby multiple routers behave as the DF for a single link. This may lead to routing loops in the multicast network. Avoiding unnecessary elections may reduce the likelihood of routing loops resulting from DF election conflicts.

A method for controlling a Designated Forwarder (DF) election in a multicast network is described herein. The multicast network includes a plurality of multicast network devices. A first network device of the plurality of multicast network device detects an active state on a second network device of the plurality of multicast network device. The first network device is identified as an acting DF. A notification of a metric measuring a distance from the first network device to a Rendezvous Point Address of the multicast network is transmitted. It is determined whether to initiate a Designated Forwarder election based on a comparison of the metric measuring the distance from the first network device and a metric measuring the distance to the Rendezvous Point Address from the second network device.

FIG. 1 is topological block diagram of a network system in accordance with an embodiment. Multicasting is commonly used to distribute data over IP networks, such as network 100.

Network 100 includes a host 106, a host 107, a host 108, a host 109, and multiple bidir-PIM routers, such as routers 110, 120, 124, 130, and 134. Host 106 and host 109 are multicast sources. Host 107 and Host 108 are multicast receivers. Routers 110, 120, 124, 130, and 134 may be capable of acting as a designated forwarder (DF) for an interface (e.g., VLAN), for a Rendezvous Point Address (RPA). As used herein, a DF-capable router is a bidir-PIM router that is capable of acting as DF.

Host 106, router 134, and router 130 are operatively interconnected and the connection among them may include multiple network segments, transmission technologies and components.

Router 134 is generally configured to process and transfer data in network 100. Additionally, router 134 is configured to control the initiation of DF elections. Router 134 is an edge device on the edge of a network, such as network 100. As used herein, an edge device is a network switch, router, or other network device on the edge of a network. Host devices connect directly to the edge device via an edge port.

Router 130 is operatively coupled to router 110 and router 134 and is configured to process and transfer data in a network, such as network 100. Additionally, router 130 is configured to control the initiation of DF elections. Router 110 is operatively coupled to router 120, router 124 and router 130. Furthermore, router 110 is configured to process and transfer data in a network, such as network 100, and to control the initiation of DF elections.

Router 120 is operatively coupled to router 110 and router 124, and is configured to process and transfer data in a network, such as network 100. Additionally, router 120 is configured to control the initiation of DF elections. Router 124 is operatively coupled to router 120 and router 110, and is configured to process and transfer data in network 100. Additionally, router 124 is configured to control the initiation of DF elections. Router 124 is an edge device on the edge of a network, such as network 100.

A Rendezvous Point Address (RPA) is used as a root of a distribution tree for a range of multicast groups. In bidir-PIM, the RPA is a routable address, which need not reside at a physical router interface. For any particular RPA, the multicast distribution tree is a shared tree of a multicast flow, denoted (*, G) where * is a wildcard notation representing all sources and G is the multicast group address.

A Rendezvous Point Link (RPL) for a particular RPA is the physical link to which the RPA belongs. RPL 132 is a physical link between router 110 and router 130, and is the physical link to a particular RPA.

Typically, the DF decides what packets are to be forwarded. Using the shared tree, the DF distributes traffic upstream (i.e., from the sources to the RPA) and downstream (i.e., from the RPA to receivers).

For each link, except for the RPL such as RPL 132, an election is performed to select a DF. As previously mentioned, all routers on a link exchange their unicast routing metric to reach the RPA. Routers advertise their own metrics using offer, winner, backoff, and pass PIM control messages. The router with the best route to an RPA is elected as the DF.

For example, router 134 is the DF on the link between host 106 and router 134. Router 130 is the DF on the link between router 134 and router 130. Router 110 is the DF for the link between router 124 and router 110. Router 120 is the DF for the link between router 120 and router 124. Router 110 is the DF for the link between router 110 and router 120. Finally, router 124 is the DF for the link between router 124 and hosts 108 and 109.

When more than one router behaves as the DF, multicast routing loops may occur. For example, host 107 and host 108 are receivers for the multicast group of a particular multicast packet sent from host 106, which is the source of the packet. Host 107 is on the link between router 120 and router 124. Router 120 and router 124 both see the join of host 107 to the multicast group and both believe they are responsible for delivering traffic on that link. To illustrate, the packet from host 106 is routed to router 134, which then forwards to router 130, which then forwards to router 110. Router 110 forwards the packet to router 120, since host 107 is a valid receiver. Router 110 also forwards the packet to router 124, since host 108 is a valid receiver. Upon receiving the packet from router 110, router 120 forwards the packet to host 107 which is on the link between router 120 and router 124. Likewise, upon receiving the multicast packet from router 110, router 124 forwards the multicast packet to host 108 and on the link between router 120 and router 124. When router 124 receives the multicast packet from router 120, it forwards the packet towards RPL 132, i.e., to router 110. Again, router 110 forwards the multicast packet to router 120 and router 124. The result is a multicast routing loop, which severely impacts the performance of network 100.

Routing loops may result from conflicts in DF elections, e.g., where multiple routers behave as the DF for the same link. A reduction in the number of superfluous DF elections performed may reduce the likelihood of routing loops. In other words, by controlling when DF elections are performed, the number of elections performed may be reduced.

As described in RFC 5015, various conditions may trigger the initiation of a DF election. One of these conditions is when a new PIM neighbor becomes active on a link. Typically, this occurs when a new router is added to the link (e.g., PIM is enabled and ready to run on the network device) or an existing router on the link is rebooted. To initiate the DF election, the new PIM neighbor sends an offer message to all other PIM neighbors on the link.

However, a new election may be unnecessary unless the new PIM neighbor should become the DF on the link. Typically, the new PIM neighbor does not learn of the identity of the current DF until an election is started. As described herein, a new election is triggered when it is determined that the new PIM neighbor is a better candidate to serve the DF role for the link, based on information provided by the router currently functioning as the DF (hereinafter, "acting DF").

For example, router 120 may be the acting DF for an interface on the link between router 120 and router 124. Router 124 may be initially inactive. When router 124 becomes active on the link, router 120 detects that a new PIM neighbor is on the link. Two pieces of information are then transmitted by router 120 to all PIM neighbors on the link, including the detected new PIM neighbor (i.e., router 124). One identifies the router 120 as the DF for the link. Another provides a group-to-RPA map. As described in RFC 5059, a PM router maintains a collection of group-to-RPA mappings, called an RP-Set. Typically, this information is used by the PIM router to determine the RPA for a multicast group. As further described below, the group-to-RPA map is also used to calculate the routing metrics of router 124. In another embodiment, this information may be provided in a single PIM message or multiple PIM messages.

Router 120 also transmits a DF election winner message to all PIM neighbors on the link, including router 124. The DF election winner message declares the identity of the winner DF and that router's metrics to reach the RPA.

In response to receiving the message identifying the DF for the link, the new PIM neighbor (e.g., router 124) knows that at least one DF exists already for the RPA on the link. Router 124 expects to receive a winner message from the DF and waits for this message before initiating an election.

When the DF election winner message is received, the metrics of the DF for the link are compared with the metrics of the new PIM neighbor. Continuing with the example as described above, router 124 uses the group-to-RPA map to determine its own metrics to the RPA. Router 124 then compares its own metrics to the metrics received by the acting DF, e.g., router 120. Typically, the DF for a link should be the router on that link with the best unicast routing metric(s) to reach the RPA. If the local metrics (e.g., metrics of router 124) are better than that of the acting DF (e.g., router 120), the new PIM neighbor is triggered to initiate an election, for example, by sending a DF election offer message to all PIM neighbors on the link.

A single RPA is described herein, however, a number of additional RPAs and associated groups may be set up over the same IP network 100. Each such additional group may use at least one of routers 110-134, any one of which may be designated as the DF for other multicast groups.

Embodiments can also be applied in other network topologies and environments. Network 100 may be any type of network familiar to those skilled in the art that can support data communications using any of a variety of commerciallyavailable protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2A:
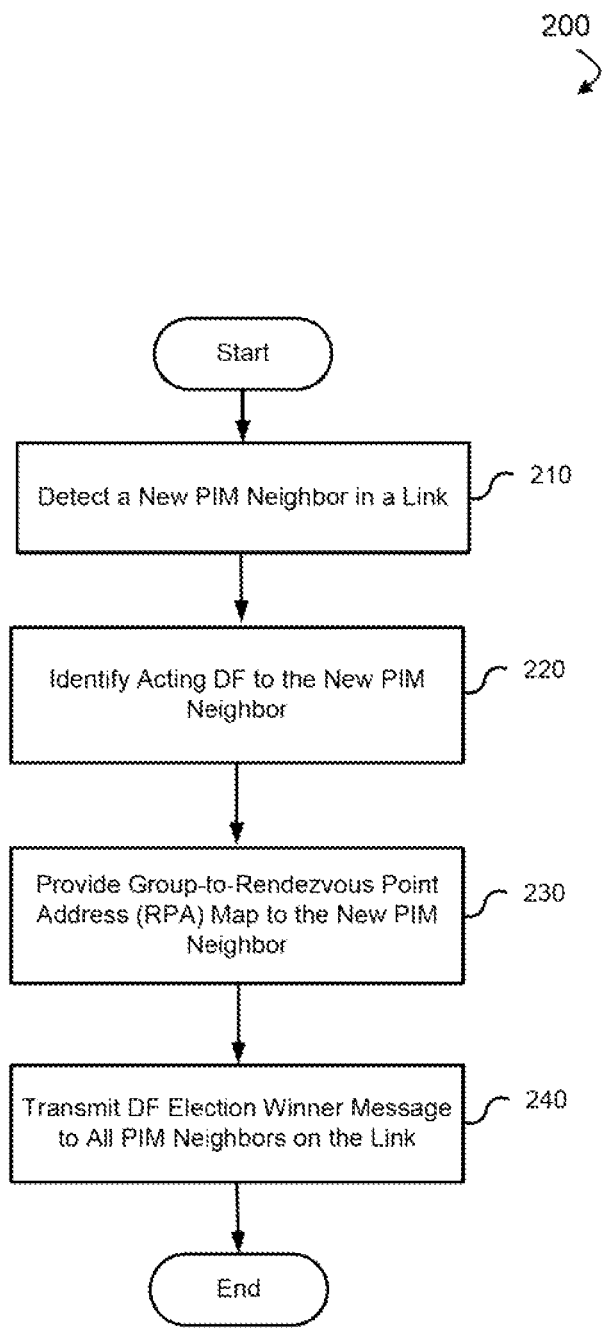
FIG. 2A is a process flow diagram for controlling elections in accordance with an embodiment.

FIG. 2A is a process flow diagram for controlling elections in accordance with an embodiment. The depicted process flow 200 may be carried out by execution of sequences of executable instructions. In another embodiment, the process flow 200 is carried out by components of a network device, an arrangement of hardware logic, e.g., an Application-Specific Integrated Circuit (ASIC), etc. For example, steps of process flow 200 may be performed by an election control module of a multicast network device.

In a multicast network implementing the bidir-PIM protocol, multicast network devices are configured to control the initiation of elections that occur in a multicast network. Typically, a Designated Forwarder (DF) election is performed for a link on a per-interface and per-RPA basis. At step 210, a new PIM neighbor is detected on a link for an interface. Specifically, a new PIM neighbor, previously in an inactive state, may become active on the link. An acting DF detects the presence of the new PIM neighbor when it is in an active state. For example, the new PIM neighbor may send a PIM-hello packet across all of its links, announcing its presence, and the acting DF may receive this. Other methods of detecting a new router may also be implemented.

At step 220, the acting DF for the link is identified to the new PIM neighbor. For example, a PIM-hello message is generated by the acting DF, providing notification to the new PIM neighbor of the acting DF's presence. The PIM-hello message generally follows the format of a standard (RFC 4601) PIM-hello message but is modified to include a parameter indicating that the router sending the message is a DF for at least one RPA. Typically, standard PIM-hello messages are sent on an active interface of a link at a specified time interval, for example, as managed by a per-interface Hello timer. Instead, as described herein, the modified PIM-hello message is generated and a sent in response to detecting the new PIM neighbor. In other words, the detection of the new PIM neighbor is the triggering event that causes the modified PIM-hello message to be sent.

At step 230, a group-to-RPA map is provided to the new PIM neighbor. The group-to-RPA mapping specifies a range of multicast groups and the RPA to which such groups are mapped. It also identifies the interfaces (e.g., VLANs) for these groups and RPAs. The group-to-RPA map is typically used by a router to construct a shared distribution tree. As previously described, the group-to-RPA map is used by the new PIM member to determine its own metrics to the RPA.

A DF election winner message is transmitted to all PIM neighbors for the interface, at step 240. The detection of the new PIM neighbor is an unsolicited trigger which causes the winner message to be transmitted. Typically, winner messages are sent at the end of the election or when the winner's metrics change.

Figure 2B:
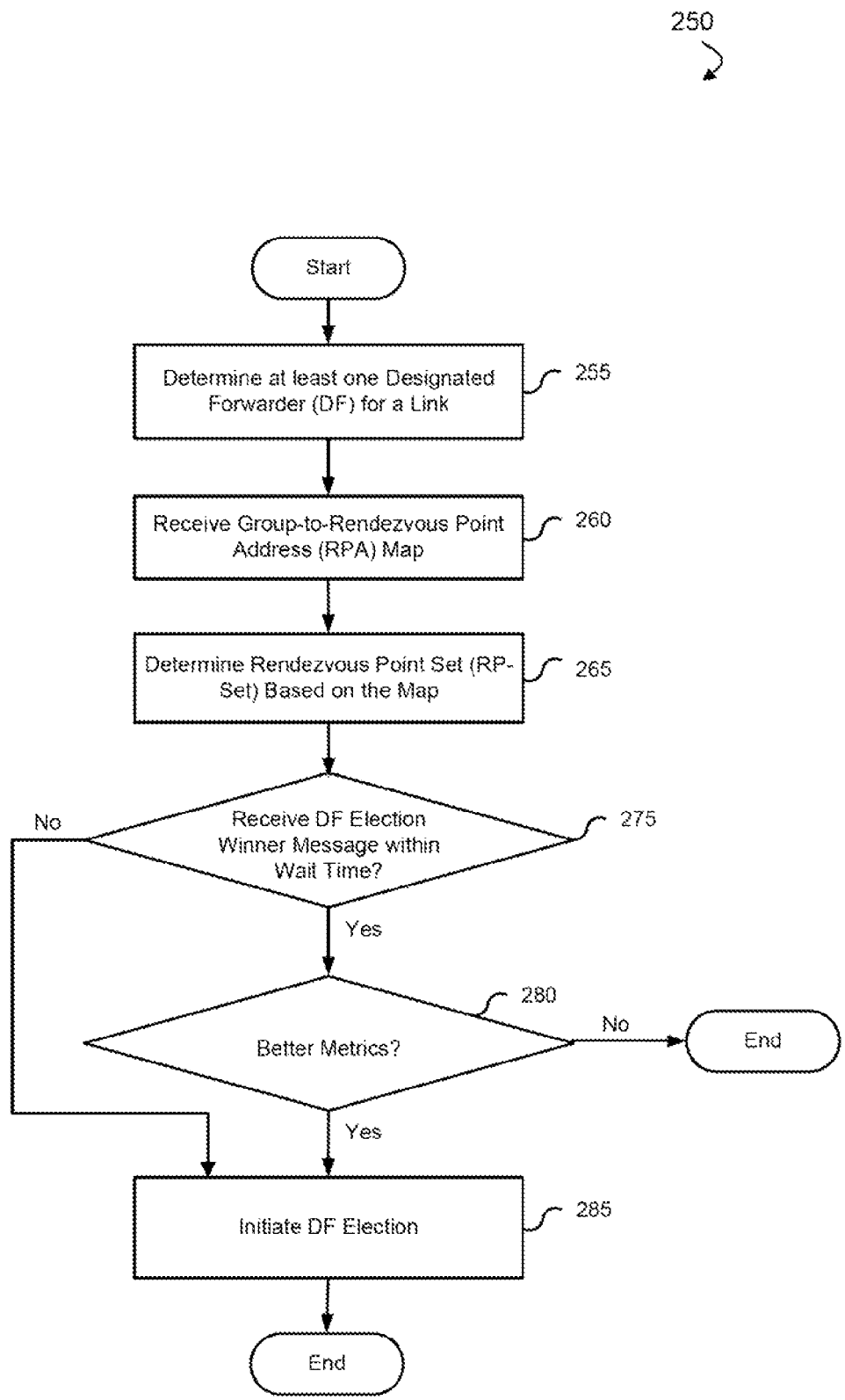
FIG. 2B is another process flow diagram for controlling elections in accordance with an embodiment.

FIG. 2B is another process flow diagram for controlling elections in accordance with an embodiment. The depicted process flow 250 may be carried out by execution of sequences of executable instructions. In another embodiment, the process flow 250 is carried out by components of a network device, an arrangement of hardware logic, e.g., an Application-Specific Integrated Circuit (ASIC), etc. For example, steps of process flow 250 may be performed by an election control module of a multicast network device.

In a multicast network implementing the bidir-PIM protocol, multicast network devices are configured to control the initiation of elections that occur in a multicast network. Typically, a Designated Forwarder (DF) election is performed for a link on a per-interface and per-RPA basis. In one embodiment, the multicast network includes an acting DF for an interface on a link. The multicast network also includes a multicast router that has transitioned from an inactive state to an active state for the interface on the link (e.g., new PIM neighbor). In one embodiment, at least one step in flow 250 is performed by the new PIM neighbor.

At step 255, it is determined that at least one DF is present for the link. For example, the new PIM neighbor may receive a PIM-hello message identifying the acting DF for the interface on the link. At this point, a DF election winner message is expected from the acting DF.

A group-to-RPA map is received at step 260, and a Rendezvous Point Set (RP-Set) is determined based on the map at step 265.

As mentioned with respect to step 255, a DF election winner message is expected from the acting DF. At step 275, it is determined whether a DF election winner message is received within a wait time. The wait time is a configurable time interval that the new PIM neighbor waits for a winner message. As previously described, the winner message includes the acting DF's unicast routing metric to the RPA. If a winner message is not received within this time interval, the DF election is initiated at step 285.

In one example, step 275 occurs on a per-RPA basis. If the acting DF is a designated forwarder for multiple RPAs, winner messages from the acting DF specify the particular RPA to which the message pertains. If the acting DF is a designated forwarder for a single RPA, winner messages from the acting DF may not specify an RPA.

In one example, the wait time is implemented on a per-RPA basis, such that each RPA is associated with its own wait time. In another example, the wait time applies to all RPAs. The wait time may be configured according to timing information provided by the acting DF. To illustrate, an acting DF sends a PIM-hello message identifying one or more RPAs for which it serves as the DF and specifying expected timing information for sending a winner message (i.e., winner message will be sent in two seconds). The new PIM neighbor sets the wait time based on the timing information, for example, and waits for two seconds.

If a winner message is received within the wait time, it is determined at step 280 whether the metrics of the new PIM neighbor are better than that of the acting DF. Specifically, the unicast routing metric of the new PIM neighbor is compared to the same metric of the acting DF. Where the metrics of the PIM neighbor indicate a shorter path to the RPA than the metric of the acting DF, a DF election is initiated at step 285. Otherwise, an election is not initiated. By controlling when elections are performed, unnecessary elections may be avoided. Reducing the number of elections can reduce the likelihood of DF election conflicts, which can lower the occurrence of severe routing loops.

Figure 3:
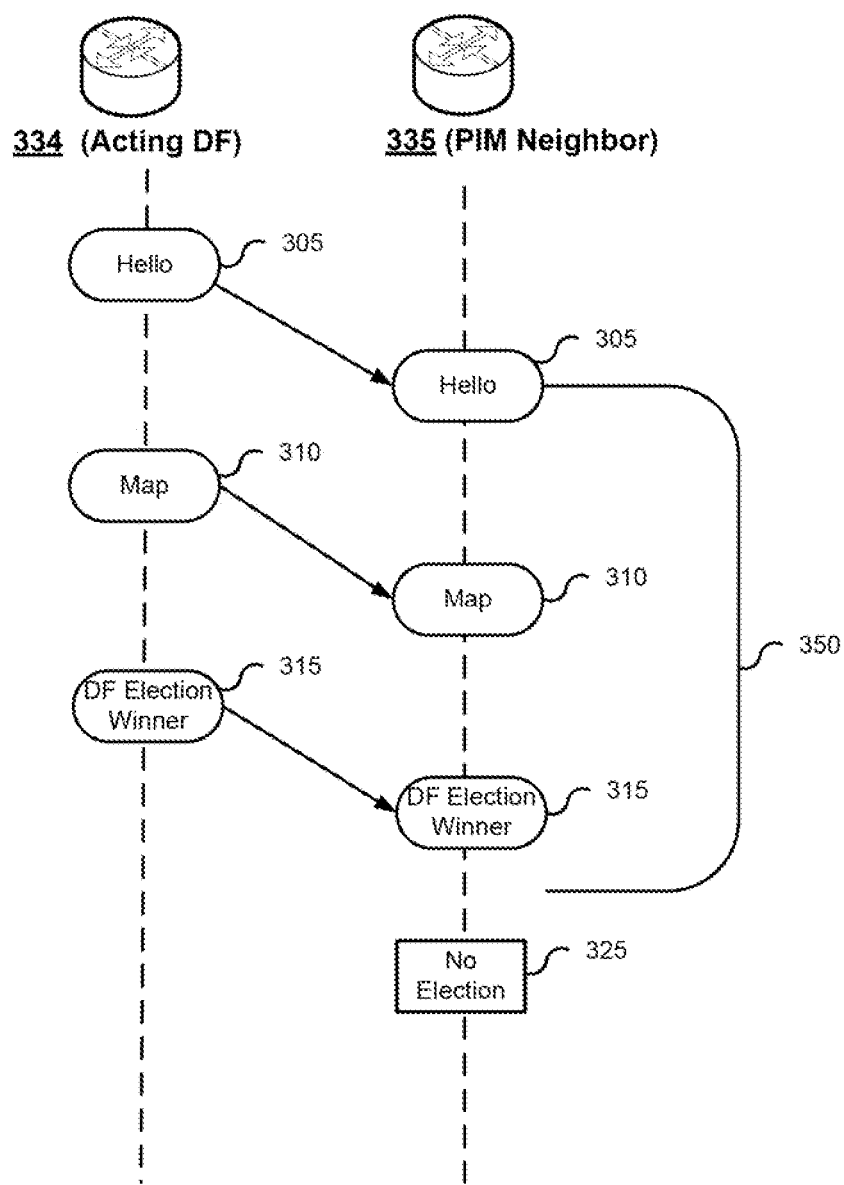
FIG. 3 is a message sequence chart in a multicast network in accordance with an embodiment.

FIG. 3 is a message sequence chart in a multicast network in accordance with an embodiment. The multicast network includes a router acting as a Designated Forwarder (DF) for an interface on a link (e.g., acting DF 334) and a router which is a PIM neighbor on the same interface and link (e.g., PIM neighbor 335). In one embodiment, acting Designated Forwarder (DF) 334 detects the presence of PIM neighbor 335, and in response, sends a modified PIM-hello message 305 on the link that includes PIM neighbor 335. Upon receiving modified PIM-hello message 305, a timer set to a hello wait interval 350 is started. The hello wait interval is the time interval that PIM neighbor 335 waits for a PIM winner message from acting DF 334.

Acting DF 334 sends a map 310 to PIM neighbor 335. Map 310 is a Bootstrap Message (BSM, RFC 5059 compliant) including a group-to-RPA map. Map 310 is received by PIM neighbor 335. Acting DF 334 also sends a DF election winner message 315 to PIM neighbor 335. Winner message 315 includes the acting DF's 334 unicast routing metric to an RPA. Winner message 315 is received within hello wait interval 350.

DF election winner message 315 is analyzed by PIM neighbor 335, and based on the analysis, it is determined that a new DF election should not be performed as represented by block 325. In particular, it is determined that the metrics of PIM neighbor 335 are not better than the metrics of acting DF 334, and as such the current DF should remain in place.

As such, DF elections are controlled and are limited to being performed upon the determination that PIM neighbor 335 is a better candidate to serve the DF role for the link. By placing restrictions or conditions on the performance of DF elections, the number of unnecessary elections may be reduced.

Figure 4:
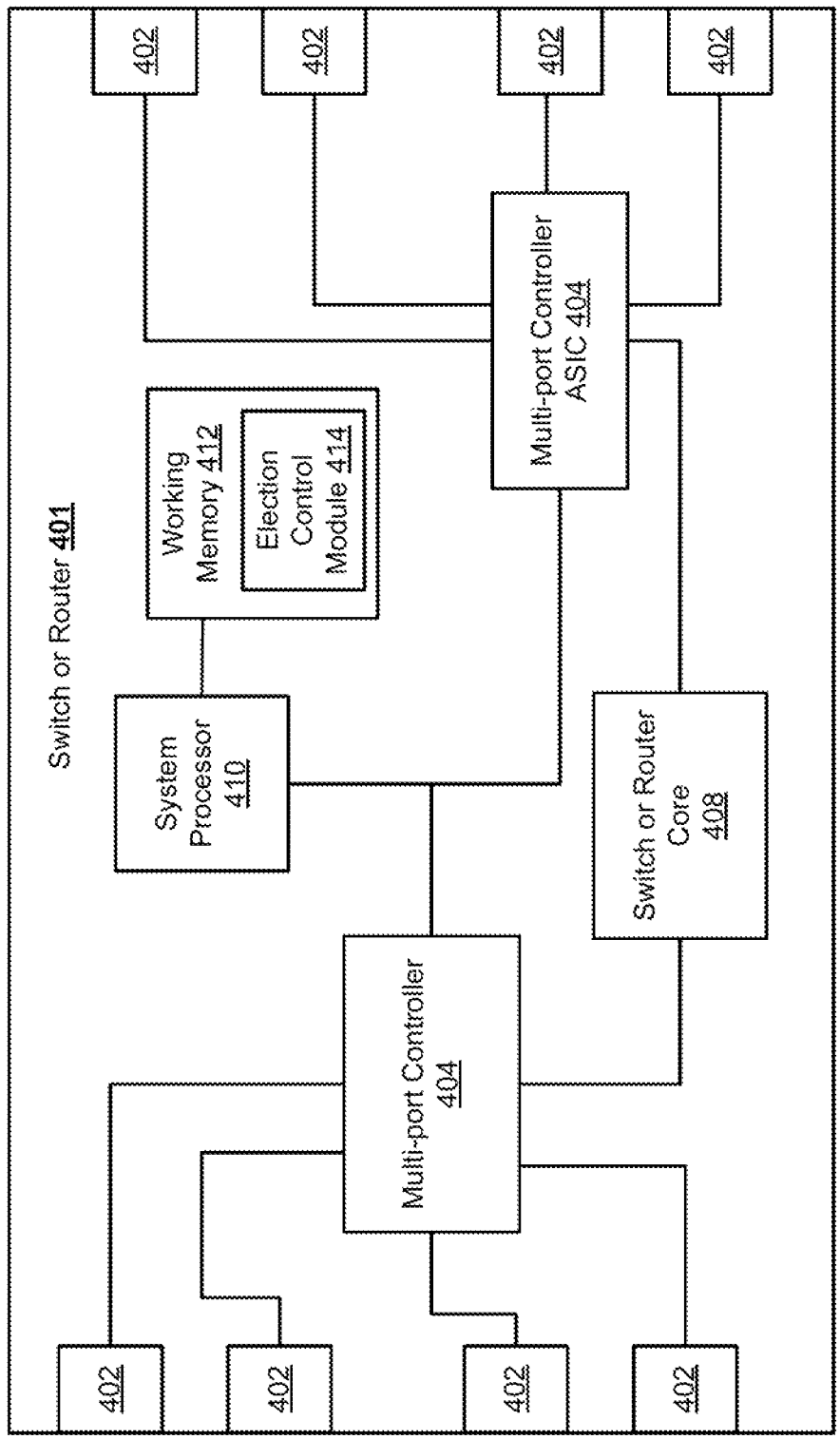
FIG. 4 is a block diagram of a switching or routing device in accordance with an embodiment.

FIG. 4 is a block diagram of a switching or routing device in accordance with an embodiment. Switching or routing device 401 may be configured with multiple ports 402. The ports 402 may be controlled by at least one controller ASIC (application specific integrated circuit) 404.

The device 401 may transfer (i.e. "switch" or "route") packets between ports by way of a switch or router core 408, which interconnects the ports. A system processor 410 and working memory 412 may be used to control device 401. Working memory 412 includes an election control module 414.

It will be appreciated that embodiments can be realized in the form of hardware, for example multi-port controller ASIC 404, software module or a combination of hardware and the software module. Any such software module, which includes machine-readable instructions, may be stored in the form of volatile or non-volatile storage such as, for example, a storage device like a ROM, whether erasable or rewritable or not, or in the form of memory such as, for example, working memory 412, RAM, memory chips, device or integrated circuits or on an optically or magnetically readable medium such as, for example, a CD, DVD, magnetic disk or magnetic tape. It will be appreciated that the storage devices and storage media are embodiments of a non-transitory computer-readable storage medium that are suitable for storing machine-readable instructions that, when executed, for example by a processor, implement embodiments. Accordingly, embodiments provide machine-readable instructions for implementing a system or method as claimed in any preceding claim and a non-transitory computer readable storage medium storing such machine-readable instructions.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for controlling a Designated Forwarder (DF) election in a multicast network, the multicast network including a plurality of multicast network devices, the method comprising:
   detecting, by a first network device of the plurality of multicast network devices, an active state on a second network device of the plurality of multicast network devices;
   identifying the first network device as an acting DF to the second network device; and
   transmitting a notification of a metric measuring a distance from the first network device to a Rendezvous Point Address of the multicast network, wherein a DF election is initiated based on a comparison of the metric measuring the distance from the first network device and a metric measuring the distance to the Rendezvous Point Address from the second network device.

2. The method of claim 1, wherein identifying the first network device comprises:
   generating a Protocol Independent Multicast (PIM) hello message including a parameter specifying the Rendezvous Point Address, wherein the first network device is an acting DF for the Rendezvous Point Address; and
   transmitting the PIM hello message in response to detecting the active state on the second network device.

3. The method of claim 2, wherein the parameter specifies a plurality of Rendezvous Point Addresses of the multicast network, wherein the first network device is an acting DF for the plurality of Rendezvous Point Addresses.

4. The method of claim 1, further comprising providing a map correlating multicast groups to Rendezvous Point Addresses.

5. The method of claim 1, wherein the first network device is the DF for an interface on a link between the first network device and the second network device.

6. The method of claim 1, wherein the notification is a Designated Forwarder Election winner message, and wherein the notification is transmitted in response to detection of the active state on the second network device.

7. A method for controlling a Designated Forwarder election in a multicast network, the multicast network including a plurality of multicast network devices, the method comprising:
   receiving, by a first network device of the plurality of multicast network devices, a message;
   determining at least one Designated Forwarder for a link based on the message;
   receiving a notification of a metric measuring a distance from a second network device of the plurality of multicast network devices to a Rendezvous Point Address of the multicast network; and
   determining whether to initiate a Designated Forwarder election based on a comparison of the metric measuring the distance from the first network device and a metric measuring the distance to the Rendezvous Point Address from the second network device.

8. The method of claim 7, further comprising:
   receiving a map correlating multicast groups to Rendezvous Point Addresses;
   determining a Rendezvous Point Set based on the map; and determining the metric measuring the distance to the Rendezvous Point Address from the first network device using the Rendezvous Point Set.

9. The method of claim 7, further comprising:
determining, based on the comparison, the metric from the first network device indicates a shorter path to the Rendezvous Point Address; and
initiating, by the first network device, the Designated Forwarder election.

10. The method of claim 7, wherein initiating the Designated Forwarder election comprises:
determining, based on the comparison, the metric from the second network device indicates a shorter path to the Rendezvous Point Address; and
restricting initiation of the Designated Forwarder election.

11. The method of claim 7, wherein the second network device is the DF for an interface on a link between the first network device and the second network device.

12. The method of claim 7, wherein the notification is a Designated Forwarder Election winner message, and wherein the notification is transmitted in response to detection of an active state on the first network device.

13. The method of claim 7, further comprising:
determining whether the notification is received within a wait time; and
initiating, by the first network device, the Designated Forwarder election where the notification is not received within the wait time.

14. A system for controlling a Designated Forwarder election in a multicast network, the multicast network including a plurality of multicast network devices, the system comprising:
a processor; and
a working memory coupled to the processor, wherein the processor is configured to:
receive a message from a first network device of the plurality of multicast network devices;
determine at least one Designated Forwarder for link based on the message;
receive a notification of a metric measuring a distance from the first network device to a Rendezvous Point Address of the multicast network; and
determine whether to initiate a Designated Forwarder election based on a comparison of the metric measuring the distance from the first network device and a metric measuring the distance to the Rendezvous Point Address from the second network device.

15. The system of claim 14, wherein the processor is configured to:
determine, based on the comparison, the metric from the second network device indicates a shorter path to the Rendezvous Point Address; and
initiate the Designated Forwarder election.

* * * * *

UNITED STATES PATENT AND TRADEMARK OFFICE
CERTIFICATE OF CORRECTION

| | | |
|---|---|---|
| PATENT NO. | : 9,031,070 B2 | Page 1 of 1 |
| APPLICATION NO. | : 13/981936 | |
| DATED | : May 12, 2015 | |
| INVENTOR(S) | : Mentze et al. | |

It is certified that error appears in the above-identified patent and that said Letters Patent is hereby corrected as shown below:

Claims
In column 10, line 11 approx., in Claim 14, delete "link" and insert -- a link --, therefor.

Signed and Sealed this
First Day of March, 2016

Michelle K. Lee
*Director of the United States Patent and Trademark Office*